Dec. 18, 1928.

J. R. McGRANIGHAN

CAKE PLATE LEVELER

Filed May 31, 1927

1,696,098

Inventor:
John R. McGranighan
By Monroe E. Miller
Attorney.

Patented Dec. 18, 1928.

1,696,098

UNITED STATES PATENT OFFICE.

JOHN R. McGRANIGHAN, OF PHILADELPHIA, PENNSYLVANIA.

CAKE-PLATE LEVELER.

Application filed May 31, 1927. Serial No. 195,482.

The present invention relates to cake plates, and aims to provide a simple and inexpensive device adapted to be placed in a china plate or dish for supporting a cake on the level, without the cake falling at the center, and also permitting the air to circulate under the cake to facilitate cooling of the cake and easy removal thereof from the plate or dish.

Another object of the invention is the provision of a device which may be economically stamped from sheet metal and which will conveniently support a cake from a china plate or dish spaced above same.

A further object is to provide such a device which may also have indicia or marks thereon to facilitate cutting the cake into pieces of predetermined size.

With the foregoing and other objects in view, which will be understood as the invention is more fully understood, the invention resides in the construction as hereinafter described and claimed, it being understood that changes can be made within the scope of what is claimed, without departing from the spirit of the invention.

The invention is illustrated in the accompanying drawing, wherein—

The device comprises a disk or circular plate 7 of aluminum or other suitable sheet metal, which may be of any suitable diameter. The disk is flat in order to support a cake thereon with its bottom flat.

Figure 1:
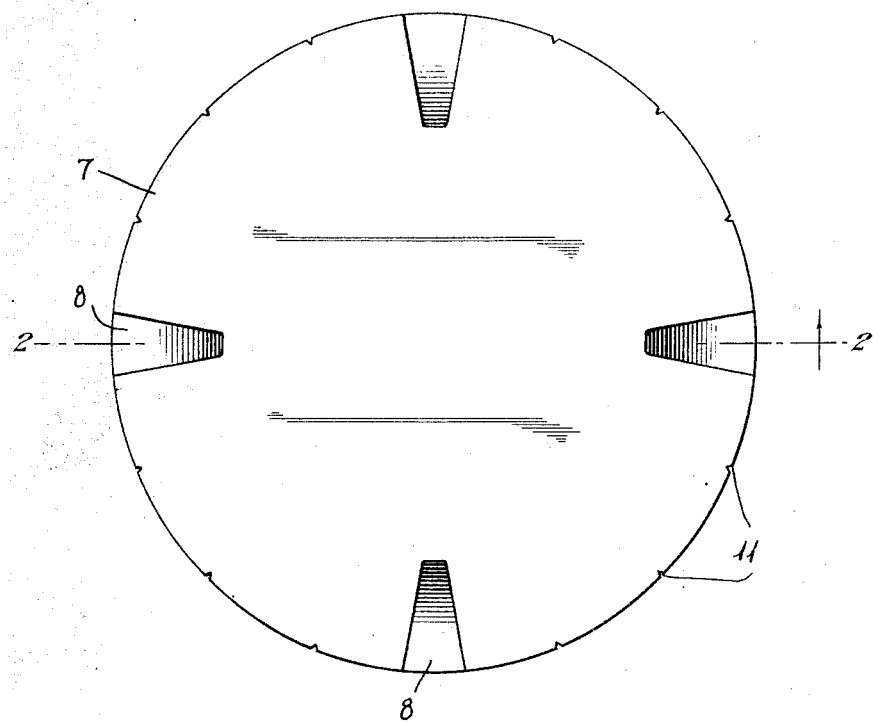
Figure 1 is a plan view of the improved device.
Figure 2:
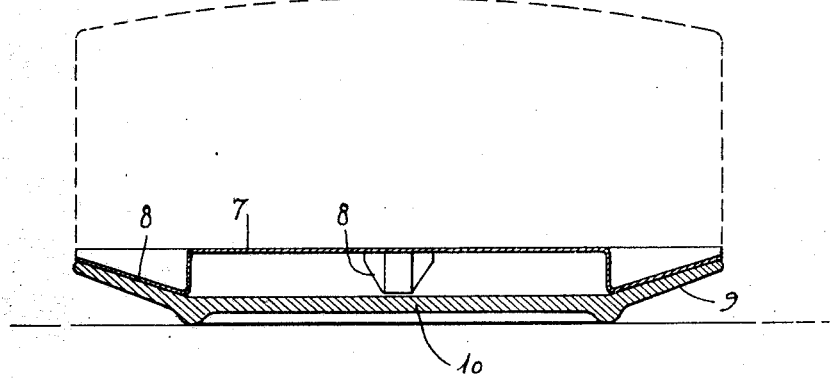
Fig. 2 is a diametrical section thereof on the line 2—2 of Fig. 1, showing the device seating in a china plate or dish, the cake being shown in broken lines.

The disk 7 has portions 8 of U-shaped section pressed downwardly therefrom at a plurality of points of its margin, and the portions 8 are narrow at their inner ends as shown and increase in width toward their outer ends. The portions 8 are inclined and they decrease in depth from their inner to their outer ends. Said portions are adapted to seat on the inclined rim 9 of a china plate or dish 10, as seen in Fig. 2. This enables the cake to be placed on the plate or dish 10 in a level condition, with the device seated on the cake plate or dish to support the cake. This will prevent the cake falling at the center such as happens when placing the cake directly on the cake plate or dish 10. Furthermore, the cake is supported above the dish 10, and the edge of the disk 7 is placed above the rim of the dish, so that air may circulate under the cake and disk, to enable the cake to be cooled after being baked. The disk 7 being spaced above the rim of the dish will also enable the disk with the cake thereon to be readily lifted from the dish.

The disk also has notches 11 in the edge thereof, preferably spaced apart equal distances in connection with the recesses formed by the portions 8, in order that said notches and portions 8 may serve as indicia or marks for conveniently cutting the cake into pieces. As shown, the cake may be conveniently cut into sixteen pieces, and there may be various numbers and arrangements of the notches 11.

Having thus described the invention, what is claimed as new is:—

A cake support comprising a sheet metal disk adapted to support a cake thereon and having integral depressed portions at spaced points of its margin, said portions extending inwardly from the edge of the dish and increasing in depth inwardly so that the bottoms of said portions are inclined to seat on the inclined rim of a dish.

In testimony whereof I hereunto affix my signature.

JOHN R. McGRANIGHAN.